US009868156B2

(12) United States Patent
Drust

(10) Patent No.: US 9,868,156 B2
(45) Date of Patent: Jan. 16, 2018

(54) SPINDLE LINER COMPONENT FOR TURNING MACHINES

(71) Applicant: Craig Drust, Sheldon (GB)

(72) Inventor: Craig Drust, Sheldon (GB)

( * ) Notice: Subject to any disclaimer, the term of this patent is extended or adjusted under 35 U.S.C. 154(b) by 114 days.

(21) Appl. No.: 14/422,578

(22) PCT Filed: Aug. 23, 2013

(86) PCT No.: PCT/GB2013/000357
§ 371 (c)(1),
(2) Date: Feb. 19, 2015

(87) PCT Pub. No.: WO2014/029957
PCT Pub. Date: Feb. 27, 2014

(65) Prior Publication Data
US 2015/0217377 A1 Aug. 6, 2015

(30) Foreign Application Priority Data
Aug. 23, 2012 (GB) .................................. 1215023.1

(51) Int. Cl.
*B23B 13/08* (2006.01)
(52) U.S. Cl.
CPC ........ *B23B 13/08* (2013.01); *B23B 2260/026* (2013.01); *B23B 2260/136* (2013.01); *Y10T 82/2595* (2015.01)
(58) Field of Classification Search
CPC ....... B23B 13/08; B23B 13/12; B23B 13/123; B23B 13/126; B23B 2260/136;
(Continued)

(56) References Cited

U.S. PATENT DOCUMENTS 2,389,913 A * 11/1945 Kasper .................. B23B 13/123
279/28
3,022,691 A * 2/1962 Lee ......................... B23B 13/08
82/162
(Continued)

FOREIGN PATENT DOCUMENTS

FR 1129278 A * 1/1957 ........... B23B 13/123
GB 356 916 A 9/1931
(Continued)

OTHER PUBLICATIONS

English translation of FR 1129278, Jan. 1957.*
(Continued)

*Primary Examiner* — Sunil K Singh
*Assistant Examiner* — Alan Snyder
(74) *Attorney, Agent, or Firm* — Buchanan Ingersoll & Rooney PC

(57) ABSTRACT

A work-piece support member forming part of a spindle liner for use within the hollow spindle of a turning machine comprising: a disc dimensioned to fit closely within the hollow spindle, having a central aperture (A) sized to accept a work-piece; holding at least one helical spring (20) positioned adjacent to the aperture (A); such that in use the axis of said spring is held perpendicular to the axis of said work-piece such that part of the side walls of said spring or springs (20) abut against said work-piece and thereby firmly support said work-piece as it rotates with the hollow spindle about the axis of said hollow spindle.

20 Claims, 7 Drawing Sheets

(58) Field of Classification Search
CPC . B23B 2260/026; B23Q 3/12; Y10T 82/2595; Y10T 82/2593
See application file for complete search history.

(56) References Cited

U.S. PATENT DOCUMENTS

| | | | | |
|---|---|---|---|---|
| 3,177,744 | A | * | 4/1965 | Davidson ............... B23Q 7/008 279/66 |
| 3,206,220 | A | * | 9/1965 | Ferranti ............... B23B 13/126 192/111.1 |
| 3,933,062 | A | * | 1/1976 | Huber ................. B23B 13/08 82/163 |
| 3,958,809 | A | * | 5/1976 | Child ................. B23B 31/1173 279/133 |
| 4,149,437 | A | * | 4/1979 | Winberg ............... B23B 13/123 82/163 |
| 4,788,895 | A | * | 12/1988 | Spooner ................. B23B 13/08 82/124 |
| 2002/0029669 | A1 | * | 3/2002 | Trusty .................. B23B 13/123 82/162 |

FOREIGN PATENT DOCUMENTS

| | | |
|---|---|---|
| GB | 387 487 A | 2/1933 |
| GB | 481 116 A | 3/1938 |
| GB | 763 620 A | 12/1956 |
| SU | 653 031 A1 | 3/1979 |

OTHER PUBLICATIONS

International Search Report (PCT/ISA/210) dated Jan. 7, 2014, by the Great Britain Patent Office as the International Searching Authority for International Application No. PCT/GB2013/000357.
Great Britain Search Report dated Dec. 4, 2012.

* cited by examiner

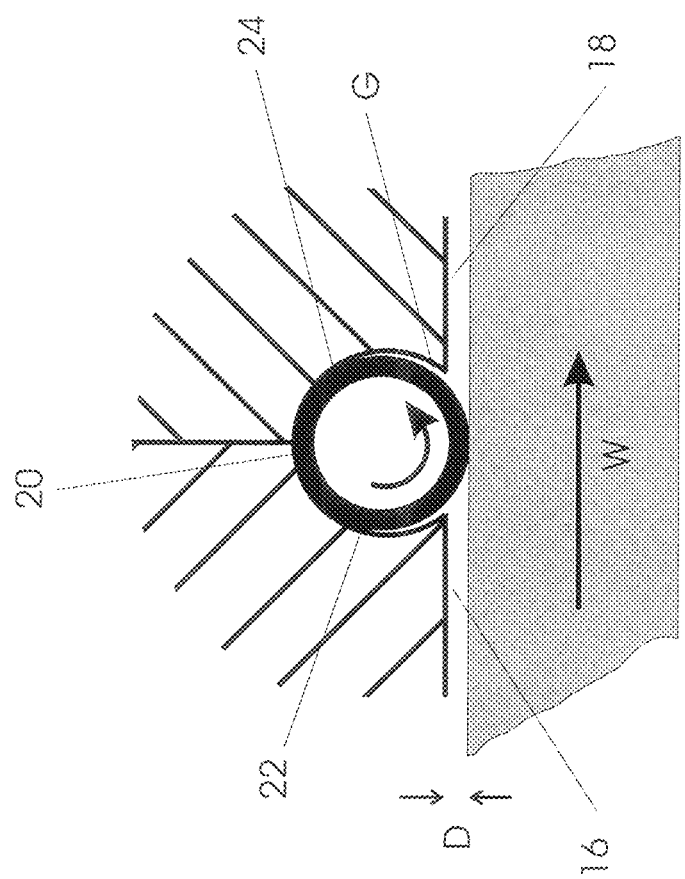

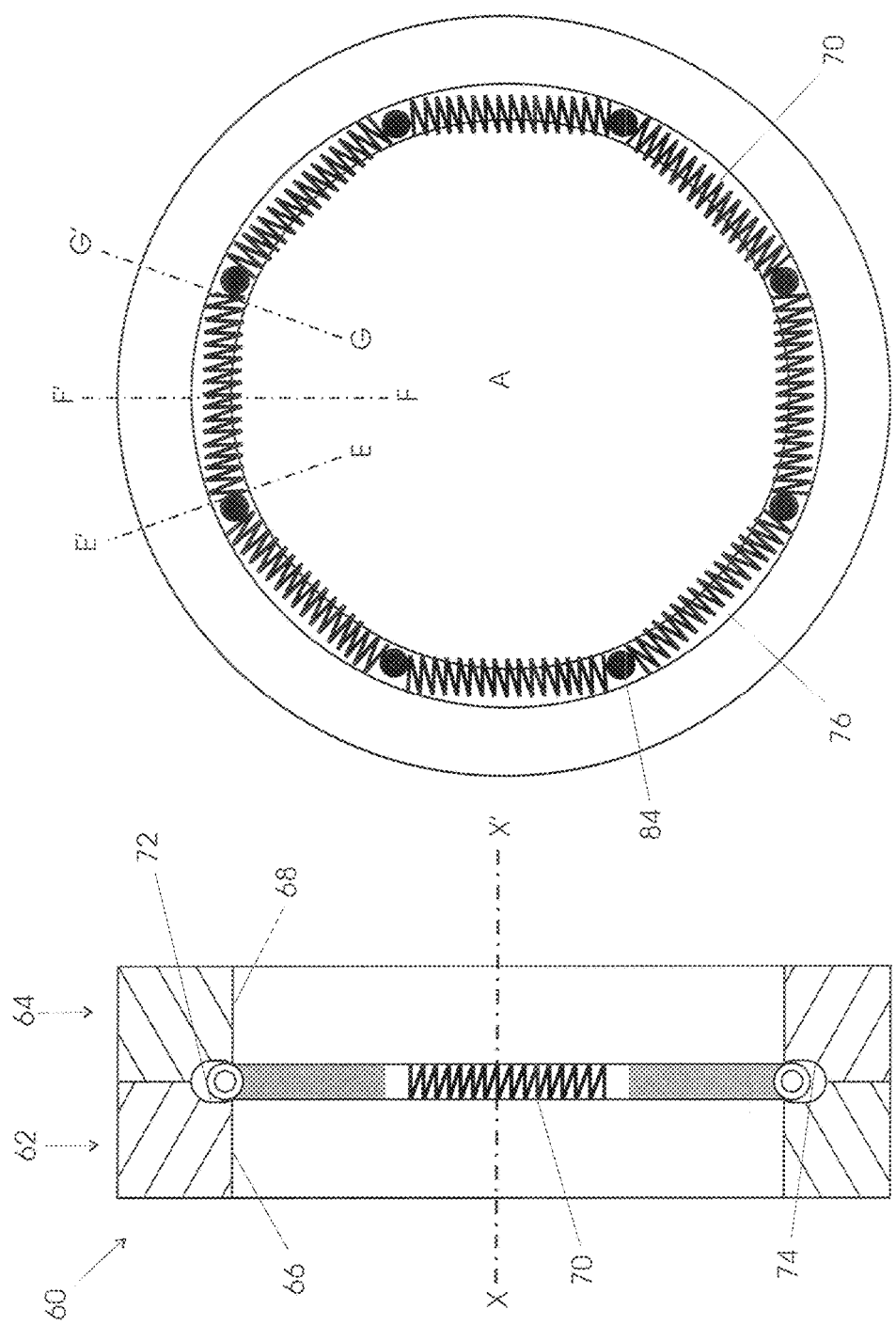

SPINDLE LINER COMPONENT FOR TURNING MACHINES

TECHNICAL FIELD

The present invention relates to an improved liner and/or component thereof (support member) for use within a hollow spindle of a turning machine; especially a CNC lathe.

BACKGROUND ART

Turning machines, such as lathes, are widely used to manufacture parts from work-pieces of various shapes (cross section). Modern CNC lathes allow rapid and automated production of machined parts. They normally feed such a work-piece through a hollow spindle that rotates with an associated lathe chuck; and is located behind the chuck. This allows a rotating work piece to be progressively (intermittently) advanced through the chuck towards the lathe cutting tools. When the machine is used to cut a work-piece having a diameter that is only slightly smaller than the inner diameter of the spindle, the work-piece is in-part supported by the spindle. However, if the diameter of the work-piece is significantly smaller than the inner diameter of the spindle, the work-piece may be substantially unsupported along the length of the spindle and may be subjected to bending as a result of centrifugal forces, which cause a whipping and/or vibration (with noise) of the unsupported length of the work-piece. This makes it difficult to machine properly and to meet the required tolerances. Modern lathes, capable of operating at very high RPM rates (typically 5000-10000 RPM) may, disadvantageously, have to be run at lower than preferred speeds to obviate such problems.

The problem of adequately supporting and machining the work-piece in turning machines, during such operations has been addressed by the use of spindle liners (also referred to as filler tubes or reduction tubes), which are widely used to support a work-piece in machine spindles. Spindle liners are typically tubular in configuration; often comprising a series of connected pipe sections and flanges with an outer diameter sized for a close slip-fit within the machine spindle. Typically, they have portions with an inner diameter sized to provide a fairly close (within 0.3 to 0.6 mm) fit for the work-piece to ensure material travels through Spindle liner/reduction tube/bushings if the material is bent or deviates in cross section. Reducing the clearance below 0.3 mm requires the use of relatively expensive, ground/bright work-piece material manufactured to tighter tolerance of diameter and straightness.

Even with such liners vibration of the work piece can be a problem as the work-piece is not evenly supported; for example, small diameter work-pieces typically flex and whip to boundaries of spindle liner reduction tube/bushing; causing damage to the spindle liner, leading also to work-piece material being scrapped as a result of damage. Vibration of the entire work-piece becomes more of an issue as the diameter/length of material increases (therefore the mass of material increases to be contained). All of these problems are typically reduced by limiting machining speed; however, this adversely affects the attainment of required manufacturing tolerances.

DISCLOSURE OF THE INVENTION

An aim of the present invention is to provide improved means of supporting a work piece within the hollow spindle of a turning machine; particularly a CNC lathe. A further aim is to provide a spindle liner that tightly grips and supports a smaller work-piece. The present invention may form a part of such a spindle liner; for example several units may be connected with intermediate pipe sections to provide a complete spindle liner or several units may be located (fixed) within the spindle bore.

In one aspect the invention comprises: apparatus for supporting a work-piece within a hollow spindle of a turning machine comprising: a first and second disc/disc-assembly each with a central aperture of substantially the same size, defined by central aperture walls, configured to accept a work-piece; said first and second discs being held in side-by-side (adjacent) configuration such that said central apertures generally align with each other; and at least one spring/resilient member housed between adjacent first and second discs; within at least a pair of channels or grooves located adjacent at least part of said aperture walls such that part of the spring/resilient member protrudes inwardly beyond said walls.

Preferably, said spring/resilient member comprises a helical spring.

Preferably, in use a part of the cylindrical side wall of said at least one spring abuts against said work-piece and thereby firmly supports said work-piece during rotation of said work-piece, apparatus and hollow spindle, about the axis of said hollow spindle.

Preferably, the at least one spring comprises a helical spring and said at least one spring is held within said disc assembly such that the longitudinal axis of said at least one spring is perpendicular to the axis of said central aperture and in use perpendicular to the axis of rotation of the hollow spindle of the turning machine. Preferably, the at least one spring only encircle(s) said central aperture (A) once.

Said grooves may be arcuate in cross section. Preferably, each groove is at least partly arcuate in (radial) cross section. The grooves may also include flat face portions that are parallel to each other.

Preferably, the radius of the arcuate cross section grooves exceeds (on average) than that of radius of the spring by a distance in the range 0.05 to 0.1 mm. In use, this advantageously allows the spring to intermittently rotate about its longitudinal axis and thereby facilitate axial movement of a work-piece. Preferably, said part of the spring/resilient member protrudes inwardly beyond said walls by a distance (D) of between 0.1 and 2 mm; preferably between 0.2 and 1 mm; and most preferably between 0.3 and 0.7 mm. This allows the spring to deform slightly within the housing and thereby abut against the work-piece and at the same time inwardly bias the work-piece owing to the resilience of the spring material. Thus, the work piece may be firmly held and supported; but at the same time the tightness of the grip may be controlled by selecting a spring with appropriate dimensions and material of construction. Preferably, said spring/resilient member comprises at least one helical spring of external diameter in the range 2 to 16 mm; and/or a pitch in the range 1 to 4 mm; and/or thickness in the range 0.5 to 2 mm.

The central aperture (A) may be circular; elliptical; circular; polygonal; or "T-shaped" etc. in cross section. Preferably, there are a plurality of pairs of grooves (22,24) that extend around each central aperture (A) with intermediate breaks. The resilient member may be a suitably sized substantially cylindrical insert made of a resilient non-metallic material.

In another aspect the apparatus of the invention comprises a work-piece support member forming part of a spindle liner for use within the hollow spindle of a turning machine comprising: a disc/disc-assembly dimensioned to fit closely within the hollow spindle, having a central aperture (A) sized to accept a work-piece; said disc/disc-assembly holding at least one helical spring positioned adjacent to the aperture (A); where in use, the axis of said spring is held perpendicular to the axis of said work-piece such that part of the side walls of at least one spring abut against said work-piece and thereby firmly support said work-piece as it rotates with the hollow spindle about the axis of said hollow spindle.

In a further aspect the invention comprises apparatus for supporting a work-piece within a hollow spindle of a turning machine comprising: a first and second disc/disc-assembly each with a central aperture of substantially the same size, defined by central aperture walls, configured to accept a work-piece; said first and second discs being held in side-by-side (adjacent) configuration such that said central apertures generally align with each other; and at least one helical spring housed between adjacent first and second discs; within at least a pair of channels or grooves located alongside/adjoining and generally parallel to at least part of an edge of said aperture walls such that a minor side part of the side wall of the spring(s) protrudes inwardly beyond said walls.

In yet a further aspect the invention comprises apparatus for supporting a work-piece within a hollow spindle of a turning machine comprising a disc/disc-assembly dimensioned to fit closely within said hollow spindle; said disc having a central aperture (A) sized to accept a work-piece; and further comprising at least one resilient member positioned, in a recess/channel/groove within said disc, adjacent to said aperture; such that in use part of said resilient member(s) abut(s) against said work-piece and thereby firmly supports said work-piece during rotation around the axis of said hollow spindle. Preferably, the resilient member is a helical spring and preferably the axis of said spring is held substantially perpendicular to the axis of said work-piece inserted within said apparatus.

The disc-assemblies of any of the above aspects of the invention may comprise a split ring or a plurality of generally arc-shaped members.

In any of the above aspects of the invention, when the at least one spring/resilient member is a helical spring it may have an additional member inserted within and along the axis of the at least one helical spring; for example, a suitably sized cylindrical insert made of a resilient material such as rubber. This may advantageously further increase the resilience of the spring. Alternatively, the cylindrical insert may be braided steel wire or the like and in this case will be used to stiffen the helical spring, while still allowing it to flex.

The invention may also comprise a spindle liner for supporting a work piece within the hollow spindle of a turning machine: comprising apparatus as described above.

BRIEF DESCRIPTION OF DRAWINGS

The present invention is illustrated by the following diagrammatic figures in which:

FIG. 3 shows an upper part of FIG. 1 showing the spring housing in greater detail;

FIG. 8 is a sectioned side elevation of the support member according to a fourth embodiment of the invention;

FIG. 9 is an end elevation of the first disc of the support member of FIG. 8, including eight springs;

DETAILED DESCRIPTION

Figure 2:
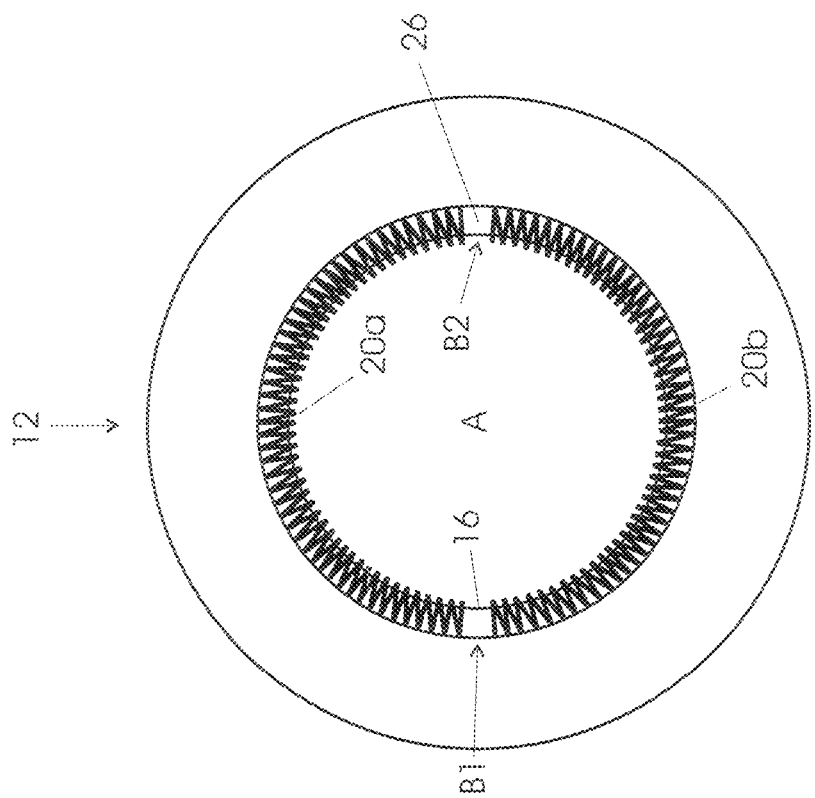
FIG. 2 is an end elevation of the first disc of the support member of FIG. 1.
Figure 1:
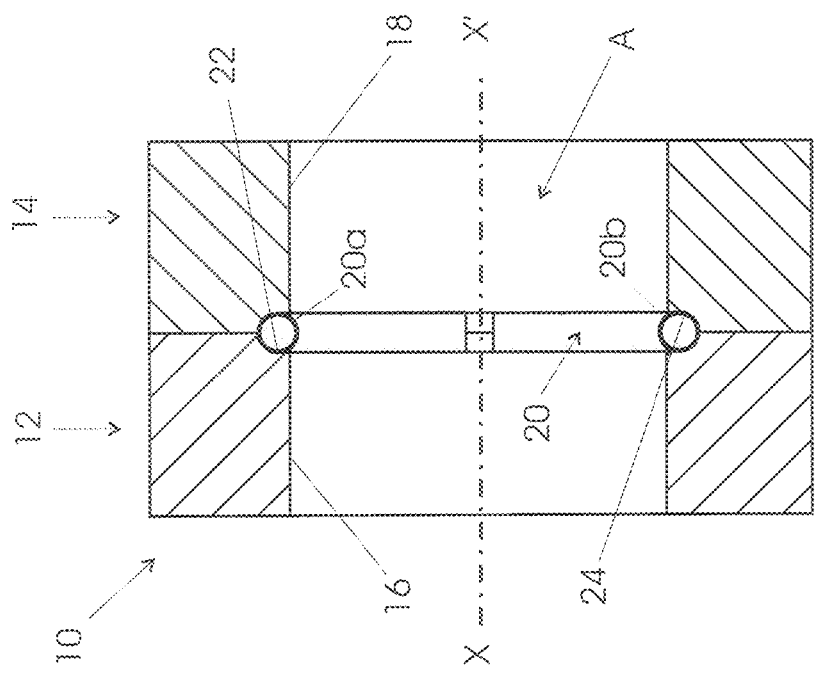
FIG. 1 is a sectioned side elevation of the support member according to a preferred embodiment of the invention.
Figure 4:
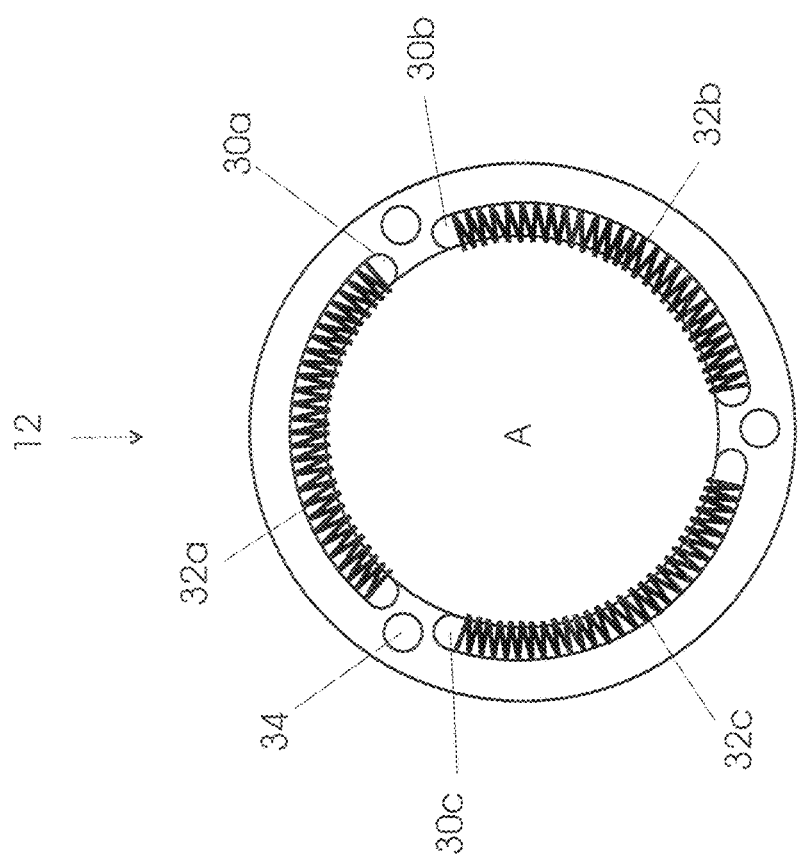
FIG. 4 is an end view of the first disc of the support member according to a second embodiment of the invention.

The invention will now be described in detail by reference to FIGS. 1 to 7. FIGS. 1 and 2 show a side view and an end view of a support member (10) according to a first embodiment of the present invention. The support member (10) is cylindrical in shape; with a central aperture A (sized to accept a work-piece); and is dimensioned to closely fit (slip-fit) within the hollow spindle of a turning machine. The support member (10) comprises a first disc (12) and a second disc (14) each with a central aperture that in use form part of said central aperture (A) and where in use the discs (12, 14) are held in side-by-side/adjacent configuration by bolts or pins that pass through suitably sized and positioned holes (not shown). The inner face of each disc (12, 14) has an arc-shaped groove (22, 24), located adjacent the inner face (12,14) of each disc, as shown for the first disc (12) in FIG. 2; each of these grooves (22, 24) has a similar arcuate cross-section (see FIG. 1) such that in use the grooves (22, 24) cooperate to provide a channel(s) (26) that holds a pair of helical springs (20a, 20b) in a generally semi-circular orientation (see FIG. 2) such that a minor portion of the side wall of each spring (20a, 20b) extends beyond the inner walls (16, 18) of the two apertures in the first disc (12) and the second disc (14) respectively, that together comprise central aperture A. Typically, the two springs will so extend/protrude by a distance (D—see FIG. 3) in the range 0.2 mm to 1.0 mm; and preferably in the range 0.4 to 0.6 mm. Preferably, the length of these springs is such as to provide two small gaps (B1 and B2) between the ends of each spring (see FIG. 2). When a cylindrically shaped work piece (W—not shown), of diameter slightly less than the diameter of aperture A, is inserted within the support (10) the resilience of the springs (20), combined with said protrusion (extension) of a minor part of the side wall of each spring within said aperture A, allows the support member (10) to firmly support the work-piece (W); such that in use part of the side walls of the springs (20) abut against the work-piece and thereby, by means of bias, when the support member (10) is located within the hollow spindle of a turning machine firmly support said work-piece (W) such that it may rotate (with the support member) about the axis of said hollow spindle. It can be seen that the arcuate axis of each spring is held approximately perpendicular (or perpendicular) to the axis X-X' of the support member (see FIG. 1). This is advantageous, as in this position in use the springs allow the work piece to be more easily intermittently advanced axially towards the chuck of a turning machine (for example, by use of a bar-feed machine).

FIG. 3 shows an upper portion of FIG. 1 in more detail and also part of a work-piece (W) in contact with one of the springs (20). Preferably, the external diameter of the spring (20) is such as to provide a small gap (G) between the outer wall of the spring and the channel (26) wall, as provided by the arcuate grooves (22, 24). While in use this gap (around the spring) will vary, an average value in the range 0.05 to 0.1 mm is preferred. Thus, if the average value of the gap G was 0.075 mm; then for a helical spring with an external radius of 3 mm, the radius of the arcuate grooves (22, 24) would be 3.075 mm. This advantageously, allows the spring to rotate around its longitudinal axis as the work-piece is progressively advanced (see above) through the spindle liner; as shown by the arrows in FIG. 3. This results from the protrusion of part of the wall (20a) of the spring within the central aperture (A) combined with the grip that this part of the spring (20a) exerts upon the work-piece (as a result of its resilience). The properties of the spring are preferably chosen such that in use it grips and supports the work-piece in a way that it readily allows such axial movement of the work-piece without gripping the work-piece in a vice-like manner (which would make it difficult to progressively advance the work-piece) as it is fed through the hollow spindle liner.

In a second embodiment of the invention (see FIG. 4) the continuous (circular) grooves (22, 24) in the first and second disc are replaced by three arcuate groove portions (30a, 30b, 30c); each of these arcuate grooves having the same arcuate cross-section such that in use the arcuate grooves provide means (channels) of holding three helical springs (32a, 32b, 32c) in a generally circular orientation. This advantageously allows pin holes (34) (for holding the two discs in side-by-side position using pins) to be located in the gap between the three arcuate grooves. Such an arrangement is favoured when the aperture A is relatively large compared to the bore of the hollow spindle of the turning machine.

Figure 6:
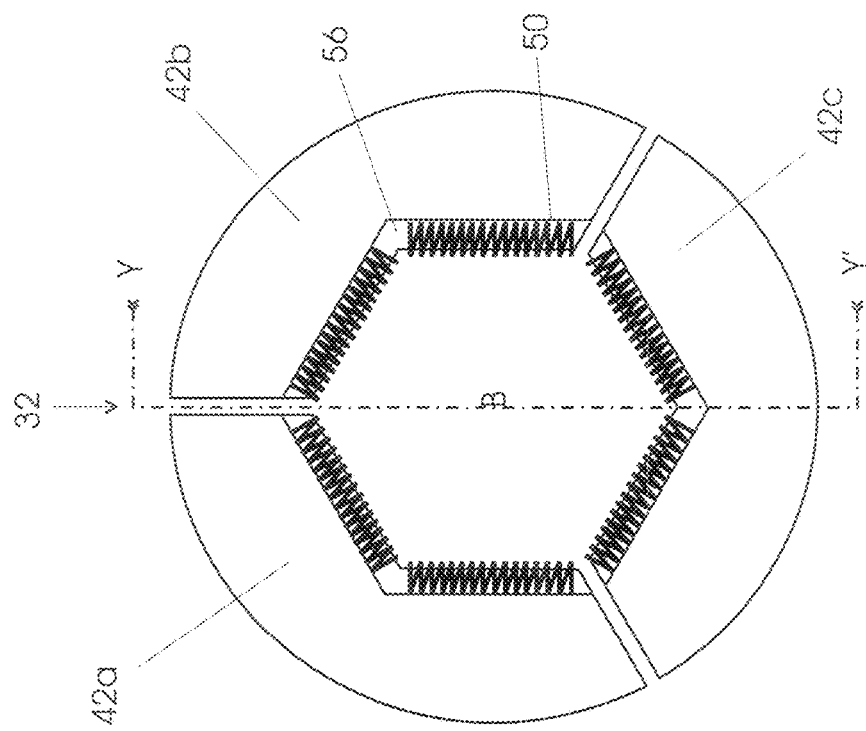
FIG. 6 is an end elevation (in the direction X'-X) of the first disc-assembly of the support member of FIG. 5, including six springs and three disc portions.
Figure 5:
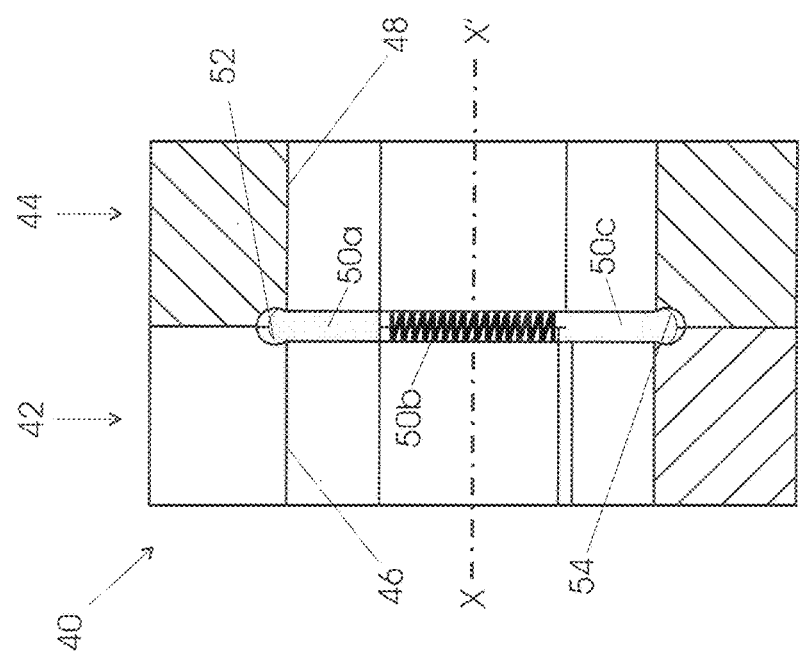
FIG. 5 is a sectioned side elevation of the support member according to a third embodiment of the invention.

FIGS. 5 and 6 show a side view and an end view of a support member (40) according to a third embodiment of the present invention. The support member (40) is cylindrical in shape; with a central hexagonal aperture B (sized to accept a work-piece); and is dimensioned to closely fit (slip-fit) within the hollow spindle of a turning machine. The support member (40) comprises a first disc-assembly (42) and a second disc (44) each with a central aperture that in use form part of said central aperture (B) and where in use the disc (44) and disc-assembly (42) are held in side-by-side/adjacent configuration by bolts or pins that pass through suitably sized and positioned holes (not shown). The first disc-assembly (42) comprises three equal-sized disc segment portions (42a-42c). The inner face of each disc segment (42a-42c) has two linear and interconnected or separate grooves (52), as shown in FIG. 6; the inner face of the second disc (44) has six linear and interconnected or separate grooves (54). Each of these grooves (52, 54) has a similar arcuate cross-section (see FIG. 5) such that in use the grooves (52, 54) provide means (channel 56) of holding six helical springs (50) in a generally (regular) hexagonal orientation (see FIG. 6), such that a minor portion of the side wall of each spring (50) extends beyond the inner walls (46, 48) of the hexagonal apertures in the first disc-assembly (42) and the second disc (44) respectively, that together comprise central aperture B. Typically, the six springs (50) will so extend/protrude by a distance in the range 0.2 mm to 1.0 mm; and preferably in the range 0.4 to 0.6 mm. The length of these springs is such as to provide six small gaps between the ends of each spring. When a hexagonally shaped work piece (C1—not shown), that is slightly smaller than aperture B, is inserted within the support (40) the resilience of the springs (50), combined with said protrusion (extension) of a minor part of the side wall of each spring within said aperture B; allows the support member (40) to firmly support the work-piece (C1) such that in use when the support member (40) is located within the hollow spindle of a turning machine, part of the side walls of the springs (50) abut against the work-piece and thereby, by means of bias, firmly support said work-piece (W) such that it may rotate about the axis of said hollow spindle. It can be seen that axis of each spring is held approximately perpendicular (or perpendicular) to the axis X-X' of the support member (see FIG. 5). This is advantageous, as in this position in use the springs allow the work piece to be more easily progressively and intermittently advanced axially towards the chuck of a turning machine (for example, by use of a bar-feed machine).

The disc-assembly (42) may comprise unequal sized segments and the gap between the segments may be larger than illustrated in FIG. 6. Alternatively, the disc segments (42a-42c) may be replaced by a unitary disc similar to or identical to the second disc (44). The arrangement of FIGS. 5 and 6 which show a support member having six springs located around a central hexagonal aperture can be adapted for use with various shaped apertures and in particular for polygonal shaped apertures; for example the aperture B may be square and have four springs located adjacent to each internal face of the square aperture (part of the spring body protruding into the aperture). Similarly the polygonal central aperture may be a triangular or a pentagonal in shape (cross section). In these cases the disc-member will comprise a plurality of equal or unequal sized segments; but not necessarily three segments; also, the gap between the segments may be larger than illustrated in FIG. 6.

Figure 7:
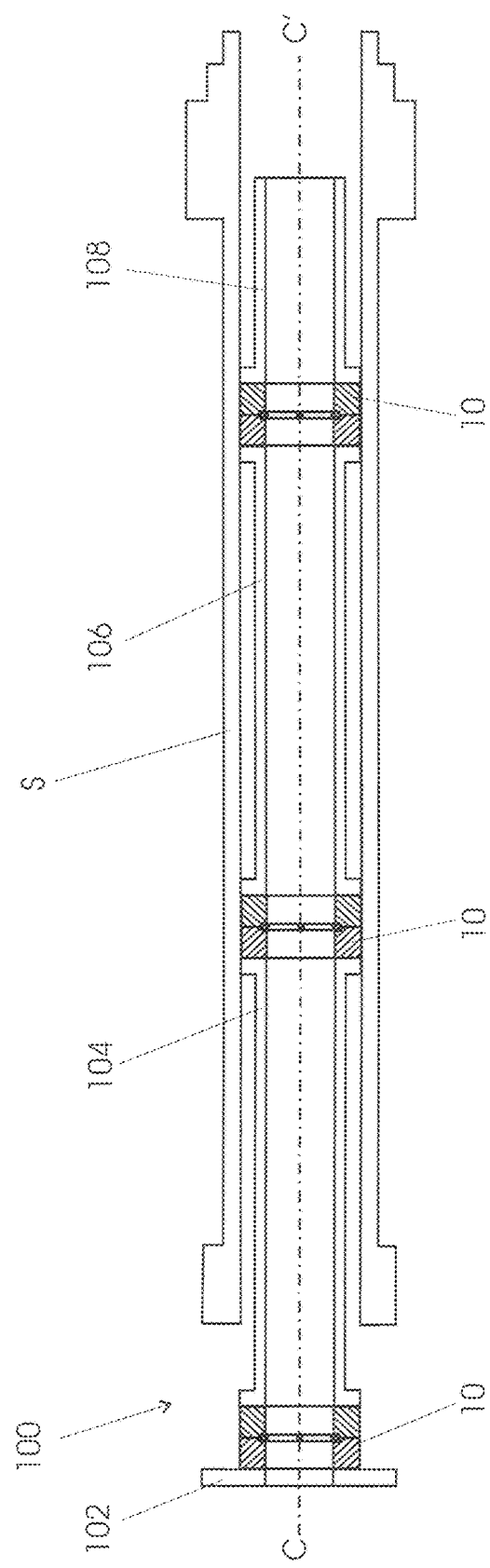
FIG. 7 shows a complete spindle liner using support members according to the present invention.

FIG. 7 shows how a support member (10, 40, 60) as described above (or latter) may form part of a spindle liner tube (100). Such a liner tube (100) may comprise a plurality of support members (10, 40, 60) held in position along a common axis (C-C') by means of a plurality of interconnecting tubes (104, 106). FIG. 7 shows three such support members (10, 40, 60) and two interconnecting tubes (104, 106). The end of the liner tube (100) most distant from the chuck of the turning machine has a larger diameter end flange (102). The end of the liner tube nearest the chuck has a shorter length guide tube (108). These components (10, 102, 104, 106, 108) are typically held in place by bolts or pins (not shown). Axis C-C' corresponds (in use) to the axis of rotation of the hollow spindle of a turning machine. In use, the liner tube (100) and support members (10, 40, 60) will rotate about the axis C-C', at the same speed as the work-piece; and may be located and held within a further (external) liner tube located within the hollow spindle of a turning machine. While the support member (10, 40, 60) will typically form part of a liner tube, they may also be (directly) located/held within the hollow spindle of a turning machine.

FIG. 8 is a sectioned side elevation of a support member (60) according to a fourth embodiment of the invention; and FIG. 9 is an end elevation (in the direction X'-X) of the first disc-segment (62) of the support member of FIG. 8, including eight helical springs (70).

Figure 10:
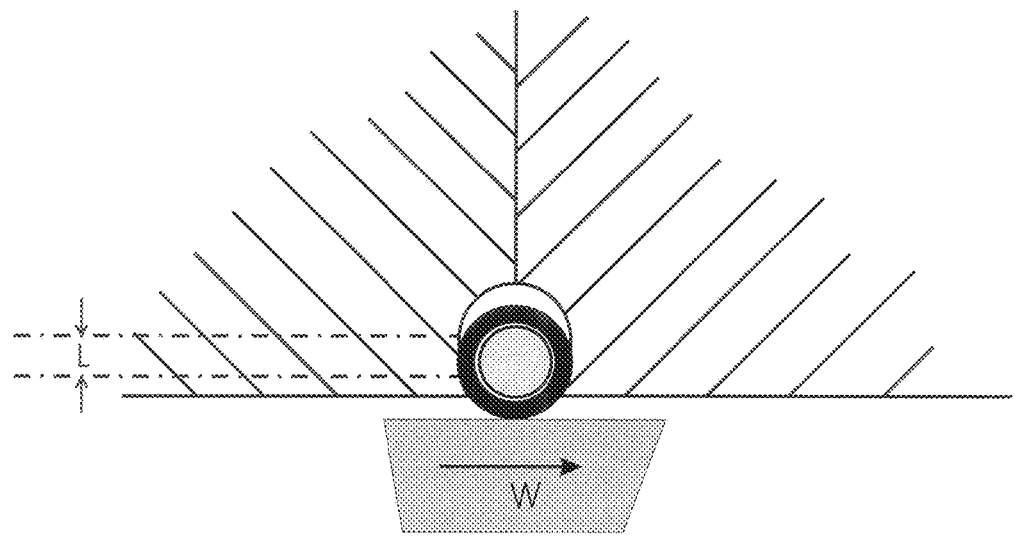
FIG. 10 shows a cross section along the line F-F' of FIG. 9; showing the upper part in more detail.
Figure 11:
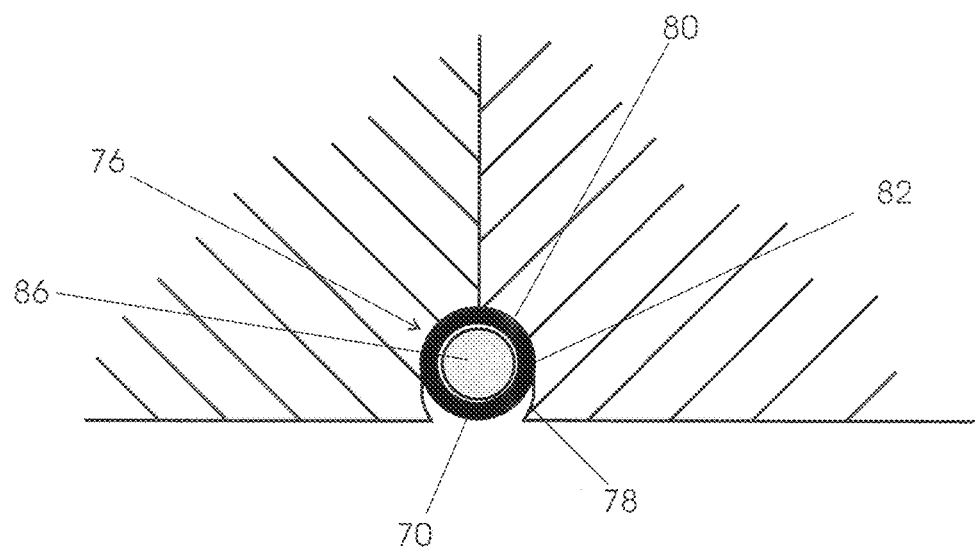
FIG. 11 shows a cross section along the line E-E' or G-G' looking towards the centre line F-F'; showing the upper part in more detail.

The support member (60) is cylindrical in shape; with a central aperture (sized to accept a work-piece); and is dimensioned to closely fit (slip-fit) within the hollow spindle of a turning machine. The support member (60) comprises a first disc (62) and a second disc (64) each with a central aperture that in use form part of said central aperture (A) and where in use the discs (62, 64) are held in side-by-side/ adjacent configuration by bolts or pins that pass through suitably sized and positioned holes (84). The inner face of each disc (62, 64) has an especially profiled groove (72, 74) as shown for the first disc (62) in FIG. 9; each of these grooves (72, 74) has a similar cross-section (see FIGS. 10 and 11) so that in use the grooves (72, 74) provide means of holding the eight helical springs (70) in a generally circular orientation (see FIG. 9) such that a portion of the side wall of each spring (70) extends beyond the inner walls (66, 68) of the two apertures in the first disc (62) and the second disc (64) respectively, that together comprise central aperture A. Typically, the springs (70) will so extend/protrude by a distance (D) in the range 0.2 mm to 1.0 mm; and preferably in the range 0.4 to 0.6 mm. When a cylindrically shaped work piece (W—not shown), of diameter slightly less than the diameter of aperture A, is inserted within the support member (60) the resilience of the springs (70), combined with said protrusion (extension) of a minor part of the side wall of each spring within said aperture A; allows the support member (60) to firmly support the work-piece (W) such that in use part of the side walls of the springs (70) abut against the work-piece and thereby, by means of bias, when the support member (10) is located within the hollow spindle of a turning machine firmly support said work-piece (W). It can be seen that the longitudinal axis of each spring is held approximately perpendicular (or perpendicular) to the axis X-X' of the support member (see FIG. 8). This is advantageous, as in this position in use the springs allow the work piece to be more easily intermittently advanced axially towards the chuck of a turning machine (for example, by use of a bar-feed machine). The channel/grooves in this embodiment differ slightly from the above-described embodiments. FIG. 10 shows a cross section along the line F-F' of FIG. 9; showing the upper part in more detail; and FIG. 11 shows a cross section along the line E-E' and G-G' showing the upper part in more detail. It will be seen that (in cross section—as shown in FIGS. 10-11) that the each groove (72, 74) has two arcuate portions (78, 80) and a flat surface portion (82) there-between. Preferably, the flat portion is between 0.5-1.5 mm deep (L). Typically, the ends of each spring (70) abut against a holding bolt (84). Preferably, each helical spring has a flexible stiffening member (86) inserted within and along the axis thereof. This stiffening member may comprise a length braided steel wire (86) or the equivalent/like.

The helical spring(s) detailed in the above embodiments may have open or closed ends (ground or not ground) or may comprise a plurality of (inter-connectable) garter springs. Further, they may be compression springs or tension springs (including springs similar to those used for pipe bending). The springs will normally made from steel or similar metals/alloys, but can be plastic springs or plastic coated metal springs.

Alternatively, instead of using a helical spring another type of spring may be used; for example a plurality of U-Shaped springs, located in a channel adjacent to said aperture (A) such that one arm of the spring protrudes inwardly beyond said aperture walls. The helical spring can be a compression type spring or a tension type spring.

It is not essential that the resilient member be a spring. Thus, the resilient member could be a helically coiled elongate strip or wire (similar in shape to helical binders used for books/documents). Alternatively, the resilient material could be a braided material, such as braided wire or braided non-metallic material.

The invention as described above offers several advantages over the prior-art. Notably, for a spindle liner using multiple support members the work-piece is supported at multiple contact points by said resilient members. Multiple support members can also be positioned to within spindle, to ensure maximum support (where required).

The support member described above eliminates clearance between the support/liner and the work-piece, thereby virtually eliminating whip clearance, vibration, and noise. This also leads to less wear and tear on the hollow machine spindle, and so improved life.

Reduction in radial movement and vibration of the work-piece during machining allow a significant increase in the machining speed (RPM); improved surface finish and reduced cycle times; the latter leading to increased productivity for each turning machine (lathe).

The invention claimed is:

1. Apparatus for supporting a work-piece within a hollow spindle of a turning machine comprising:
    a first disc-assembly and a second disc-assembly, each with a central aperture of substantially the same size, defined by central aperture walls, configured to accept a work-piece;
    said first and second disc-assemblies being held in a side-by-side configuration such that said central apertures generally align with each other;
    at least one resilient-member being housed between said side-by-side first and second disc-assemblies within a channel formed by at least a pair of grooves formed on a planar face of each disc-assembly, and located adjacent at least part of said aperture walls of each disc assembly such that part of the resilient member protrudes beyond said walls and so that, in use, part of said at least one resilient member abuts against said work-piece and thereby directly supports said work-piece during rotation about the axis of said hollow spindle; and
    where each groove comprises two arcuate portions and a flat face portion therebetween.

2. Apparatus according to claim 1 where said at least one resilient member comprises a helical spring and in use a part of a cylindrical side wall of said at least one helical spring abuts against said work-piece and thereby firmly supports said work-piece during rotation of said work-piece, apparatus and hollow spindle, about the axis of said hollow spindle.

3. Apparatus according to claim 1 comprising a plurality of pairs of grooves that extend around each central aperture with intermediate breaks.

4. Apparatus according to claim 1 where said at least one resilient member comprises a helical spring with a flexible stiffening member inserted within and along the longitudinal axis thereof.

5. A spindle liner for supporting a work piece within the hollow spindle of a turning machine: comprising apparatus according to claim 1.

6. Apparatus for supporting a work-piece within a hollow spindle of a turning machine comprising:
    a first disc-assembly and a second disc-assembly, each with a central aperture of substantially the same size, defined by central aperture walls, configured to accept a work-piece;
    said first and second disc assemblies each having a planar face said planar faces in use being held in a side-by-side configuration such that that said central apertures also generally align with each other;
    at least two resilient-members being housed between said side-by-side first and second disc-assemblies within a channel formed by at least a pair of grooves, formed on said planar face of each disc-assembly, and located adjacent at least part of said aperture walls of each disc assembly such that a minor part of each resilient member protrudes beyond said walls so that, in use, part of said at least one resilient member abuts against said work-piece and thereby directly supports said work-piece during rotation about the axis of said central aperture; and wherein said at least two resilient-members are housed and retained separately within said channel such that said at least two resilient members together only encircle said central aperture once.

7. Apparatus according to claim 6 where said at least two resilient members are helical springs that have a longitudinal axis and said helical springs rotate about said longitudinal axis as the work piece traverses said hollow spindle.

8. Apparatus according to claim 6 comprising a plurality of pairs of grooves that extend around each central aperture with intermediate breaks.

9. Apparatus according to claim 6 where each groove comprises two arcuate portions and include a flat face portion there-between.

10. Apparatus according claim 6 where the disc assembly is a split ring or comprises plurality of generally arc-shaped members.

11. Apparatus according to claim 6 where the at least two resilient members include at least one helical spring and wherein a flexible stiffening member is inserted within and along the axis of said at least one helical spring.

12. Apparatus according to claim 6 where in use said channel surrounds a majority portion of said at least two resilient members, thereby retaining said at least two resilient members within said channel such that said at least two resilient members cannot be removed or inserted within said channel without separating said first disc assembly from said second disc assembly.

13. A spindle liner for supporting a work piece within the hollow spindle of a turning machine: comprising apparatus according to claim 6.

14. Apparatus for supporting a work-piece within a hollow spindle of a turning machine comprising:
- a first disc-assembly and a second disc-assembly, each with a central aperture of substantially the same size, defined by central aperture walls, configured to accept a work-piece;
- said first and second disc assemblies each having a planar face said planar faces in use being held in a side-by-side configuration such that that said central apertures also generally align with each other;
- at least one resilient-member being housed between said side-by-side first and second disc-assemblies within a channel formed by at least a pair of grooves, each with a single smooth curved profile, formed on said planar face of each disc-assembly, located adjacent at least part of said aperture walls of each disc assembly such that a minor part of the said at least one resilient member protrudes beyond said walls so that in use part of said at least one resilient member abuts against said work-piece and thereby directly supports said work-piece during rotation about the axis of said central aperture; and
- where in use said channel surrounds a majority portion of said at least one resilient member, thereby retaining said at least one resilient member within said channel, and enclosing said majority portion within said channel, such that said at least one resilient member cannot be removed or inserted within said channel without separating said first disc assembly from said second disc assembly.

15. Apparatus according to claim 14 where the surface of said channel has a major-arc shaped cross section.

16. Apparatus according to claim 14 where said at least one resilient member comprises a helical spring and in use a part of the a cylindrical side wall of said at least one helical spring abuts against said work-piece and thereby firmly supports said work-piece during rotation of said work-piece, apparatus and hollow spindle, about the axis of said hollow spindle.

17. Apparatus according to claim 14 where said at least one resilient member only encircle(s) encircles said central aperture once.

18. Apparatus according to claim 14 where said at least one resilient member is a helical spring that has a longitudinal axis and said helical spring rotates about said longitudinal axis as the work piece traverses said hollow spindle.

19. Apparatus according to claim 14 where said at least one resilient member comprises a helical spring that is held within said disc assembly such that the longitudinal axis of said at least one helical spring is perpendicular to the axis of said central aperture and in use perpendicular to the axis of rotation of the hollow spindle of the turning machine.

20. Apparatus according to claim 14 comprising a plurality of pairs of grooves that extend around each central aperture with intermediate breaks.

* * * * *